United States Patent
Su et al.

(10) Patent No.: US 9,941,984 B2
(45) Date of Patent: Apr. 10, 2018

(54) CHANNEL STATE INFORMATION MEASUREMENT METHOD AND DEVICE, AND SIGNAL TRANSMISSION METHOD AND DEVICE

(71) Applicant: CHINA ACADEMY OF TELECOMMUNICATIONS TECHNOLOGY, Beijing (CN)

(72) Inventors: Xin Su, Beijing (CN); Chuanjun Li, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 0 days.

(21) Appl. No.: 15/116,825

(22) PCT Filed: Feb. 10, 2015

(86) PCT No.: PCT/CN2015/072650
§ 371 (c)(1),
(2) Date: Aug. 4, 2016

(87) PCT Pub. No.: WO2015/124072
PCT Pub. Date: Aug. 27, 2015

(65) Prior Publication Data
US 2017/0180064 A1    Jun. 22, 2017

(30) Foreign Application Priority Data
Feb. 21, 2014  (CN) .......................... 2014 1 0060574

(51) Int. Cl.
*H04B 7/04*    (2017.01)
*H04B 17/00*   (2015.01)
(Continued)

(52) U.S. Cl.
CPC ......... *H04B 17/318* (2015.01); *H04B 7/0621* (2013.01); *H04B 7/0413* (2013.01)

(58) Field of Classification Search
CPC ........ H04B 7/04; H04B 7/0261; H04B 17/30; H04B 17/318; H04B 7/0417; H04B 7/02; H04W 72/04
See application file for complete search history.

(56) References Cited

U.S. PATENT DOCUMENTS 9,491,654 B2    11/2016  Ko et al.
9,521,665 B2 *  12/2016  Park ....................... H04B 7/024
(Continued)

FOREIGN PATENT DOCUMENTS

CN    101282198 A    10/2008
CN    102045762 A     5/2011
(Continued)

OTHER PUBLICATIONS

International Search Report for PCT/CN2015/072650 dated May 12, 2015 and its English translation provided by WIPO.
(Continued)

*Primary Examiner* — Blane Jackson
(74) *Attorney, Agent, or Firm* — Ladas & Parry, LLP

(57) ABSTRACT

The present disclosure provides a CSI measurement method and a CSI measurement device. The CSI measurement method includes steps of: receiving channel state measurement information from a network side, the channel state measurement information including a CRS from a set of CRS ports corresponding to vertical beams having an identical $V_{shift}$ in a vertical dimension, the $V_{shift}$ determines shift values of CRS patterns in different vertical beams in the vertical dimension in a frequency domain; and performing CSI measurement in accordance with the channel state measurement information. According to the embodiments of
(Continued)

the present disclosure, the CSI measurement is performed in accordance with the CRS of the set of CRS ports corresponding to the vertical beams having an identical $V_{shift}$ in the vertical dimension, so that a common signal/channel in the vertical dimension is covered by several vertical beams. Each vertical beam has a small main lobe width, so a constant modulus weight vector may be used. As a result, it is able to improve the power efficiency.

20 Claims, 3 Drawing Sheets

(51) Int. Cl.
*H04W 72/04* (2009.01)
*H04B 17/318* (2015.01)
*H04B 7/06* (2006.01)
*H04B 7/0413* (2017.01)

(56) References Cited

U.S. PATENT DOCUMENTS

| | | | |
|---|---|---|---|
| 2009/0322613 A1 | 12/2009 | Bala et al. | |
| 2013/0272151 A1 | 10/2013 | Thomas et al. | |
| 2013/0343216 A1 | 12/2013 | Su et al. | |
| 2014/0016496 A1 | 1/2014 | Su et al. | |
| 2014/0153427 A1* | 6/2014 | Seo | H04L 1/20 370/252 |
| 2015/0124736 A1 | 5/2015 | Ko et al. | |
| 2015/0139112 A1 | 5/2015 | Park et al. | |
| 2016/0021551 A1* | 1/2016 | Park | H04B 7/0619 370/328 |
| 2016/0028519 A1* | 1/2016 | Wei | H04B 7/0456 375/267 |
| 2016/0050002 A1* | 2/2016 | Wei | H04B 7/0469 370/329 |
| 2016/0337864 A1* | 11/2016 | Song | H01Q 1/246 |

FOREIGN PATENT DOCUMENTS

| | | |
|---|---|---|
| CN | 102239649 A | 11/2011 |
| CN | 102469496 A | 5/2012 |
| CN | 102883341 A | 1/2013 |
| CN | 103380588 A | 10/2013 |
| CN | 103825664 A | 5/2014 |
| TW | 201001951 A | 1/2010 |
| WO | WO2010/064842 A2 | 6/2010 |
| WO | WO2012/112519 A1 | 8/2012 |
| WO | 2014003384 A1 | 1/2014 |
| WO | 2014007511 A1 | 1/2014 |

OTHER PUBLICATIONS

Written Opinion of the International Search Authority for PCT/CN2015/072650 dated May 12, 2015 and its English translation provided by Google Translate.
ETRI. CRC 'pattern indication and PDSCH RE mapping in multi-cell JP CoMP' 3GPP TSG RAN WGl Meeting #70:R1-123753, Aug. 17, 2012 (Aug. 17, 2012) text, section 2 and 3.
First Office Action for Chinese application No. 201410060574.8 dated Apr. 21, 2015 and search report, with machine English translation from Global Dossier.
Second Office Action for Chinese application No. 201410060574.8 dated Oct. 29, 2015 and search report, with machine English translation from Global Dossier.
Supplementary European Search Report and Opinion for European Patent application No. EP 15752277 dated Sep. 12, 2017.
First Office Action and search report for Taiwanese Patent application No. 104105230 dated Apr. 22, 2016 with English translation provided by foreign associate.
International Preliminary Report on Patentability for PCT/CN2015/072650 dated Aug. 23, 2017with English translation provided by WIPO.
English Translation of Written Opinion for PCT/CN2015/072650 dated May 6, 2015 provided by WIPO.
"CRS pattern indication and PDSCH RE mapping in multi-cell JP CoMP" 3GPP TSG RAN WG1 Meeting #70 R1-123753 Qingdao, China, Aug. 13-17, 2012.

* cited by examiner

CHANNEL STATE INFORMATION MEASUREMENT METHOD AND DEVICE, AND SIGNAL TRANSMISSION METHOD AND DEVICE

CROSS-REFERENCE TO RELATED APPLICATION

This application is the U.S. national phase of PCT Application No. PCT/CN2015/072650 filed on Feb. 10, 2015, which claims a priority of the Chinese Patent Application No. 201410060574.8 filed on Feb. 21, 2014 and entitled "Channel State Information Measurement Method and Device, and Signal Transmission Method and Device", the disclosures of which are incorporated herein by reference in their entireties.

TECHNICAL FIELD

The present disclosure relates to the field of communication technology, in particular to a channel state information (CSI) measurement method, a CSI measurement device, a signal transmission method, and a signal transmission device.

BACKGROUND

A Multiple Input Multiple Output (MIMO) technology plays an important role in the improvement of peak value and system spectrum efficiency, so conventional Long Term Evolution (LTE) or LTE-Advanced (LTE-A) radio access technologies are built on the basis of an MIMO+Orthogonal Frequency Division Multiplexing (OFDM) technology. In addition, a performance gain of the MIMO technology is derived from a degree of spatial freedom capable of being achieved by a multi-antennae system, so during the standardization, an important evolution for the MIMO technology lies in the extension of dimension.

For a base station antenna system with a conventional Passive Antenna System (PAS) structure, a plurality of antenna ports (each port corresponds to an independent radio frequency (RF)-Intermediate frequency (IF)-baseband channel) is arranged horizontally, and a plurality of antennae elements in a vertical dimension corresponding to each port is connected to each other via a RF cable. Hence, it is merely able for the conventional MIMO technology to optimize horizontal-dimension spatial characteristics of each signal by adjusting relative amplitudes/phases of different ports in a horizontal dimension, but in the vertical dimension, merely a uniform sector beamforming solution can be used. In addition, after an Active Antenna System (AAS) technology is introduced into a mobile communication system, the base station antenna system may acquire a larger degree of freedom in the vertical dimension, so it is able to optimize a signal from a User Equipment (UE) in a three-dimensional (3D) space.

Based on the above, in industry, the MIMO technology is moving in a three-dimensional and massive direction. Currently, the $3^{rd}$ Generation Partnership Project (3GPP) is studying 3D channel modeling, and in future, it is expected to study and standardize a Full Dimension MIMO (FD-MIMO) technology using more than eight ports (e.g., 16, 32 or 64 ports). In academia, the MIMO technology on the basis of a massive antenna array (including a hundred of, or hundreds of, or more antenna elements) is now being studied and tested proactively. The research and the preliminary channel test result show that, a massive MIMO technology can improve the system spectrum efficiency technically and support more users to access. Hence, the massive MIMO technology has been considered by various research organizations as one of the most potential physical layer technologies for a next-generation mobile communication system.

In addition, in an LTE system, a Cell-specific Reference Signal (CRS)-based transmission and CSI measurement mechanism is adopted by Physical Downlink Shared Channel (PDSCH) Transmission Modes (TMs) 1-7, Physical Downlink Control Channel (PDCCH) for transmitting Layer 1/2 (L1/2) control information and Physical Broadcast Channel (PBCH) for transmitting broadcast information. During the development of the LTE/LTE-A system, along with the separation of the measurement and transmission of the reference signals, the CRS is being gradually replaced with CSI-Reference Signal (CSI-RS) and UE-specific Reference signal (URS) in newly-introduced PDSCH TMs 8-10. However, for the sake of compatibility and the transmission of control and broadcast information, influences on the information transmission and the CSI measurement caused by the introduction of an AAS-based two-dimensional (2D) array need to be taken into consideration.

In a PAS array, each CRS port corresponds to fewer antenna ports. For example, in the case that there are eight bipolar antenna ports and four CRS ports, each CRS port may correspond to two antenna ports. In this case, it is able to conveniently design sector coverage beams adapted to a large angle range, and to ensure the CRS and the CRS-based transmission power efficiency. After the AAS array is used, the number of the available baseband-controllable antenna elements may increase dramatically, so it is able to form an explicitly-oriented narrow beam with for the transmission of services. For the URS-based transmission, the transmission quality depends on the number of the controllable ports and the processing gains from the 3D-MIMO technology. However, for the CRS ports, in order to make full use of their functions so as to ensure a coverage range, the number of the antenna elements corresponding to each CRS port may increase dramatically. Further, in order to meet the requirements of the sector coverage within a wider angle range, merely a non-constant modulus (CM) weight vector can be used. At this time, the power efficiency will decrease, and finally the CRS-based transmission performance and measurement accuracy will be adversely affected.

In a word, for the conventional CRS-based transmission and CSI measurement mechanism, there is a contradiction between the coverage range and the power efficiency in the AAS array. No effective scheme has been currently proposed so as to achieve the 3D-MIMO processing gains based on the AAS technology.

SUMMARY

An object of the present disclosure is to provide a CSI measurement method, a CSI measurement device, a signal transmission method, and a signal transmission device.

In one aspect, the present disclosure provides in some embodiments a CSI measurement method, including steps of: receiving channel state measurement information from a network side, the channel state measurement information including a CRS from a set of CRS ports corresponding to vertical beams having an identical $V_{shift}$ in a vertical dimension, the $V_{shift}$ determines shift values of CRS patterns in different vertical beams in the vertical dimension, in a frequency domain; and performing CSI measurement in accordance with the channel state measurement information.

Alternatively, in the case that there is only one CRS port corresponding to the vertical beams having the identical $V_{shift}$, the CRS is transmitted over a PBCH in a single-port mode via the CRS port corresponding to all the vertical beams; in the case that there are two CRS ports corresponding to the vertical beams having the identical $V_{shift}$, the CRS is transmitted over the PBCH in a Space Frequency Block Code (SFBC) mode via the set of CRS ports corresponding to the vertical beams having the identical $V_{shift}$; and in the case that there are four CRS ports corresponding to the vertical beams having the identical $V_{shift}$, the CRS is transmitted over the PBCH both in an SFBC mode and a Frequency Switched Transmit Diversity (FSTD) mode via the set of CRS ports corresponding to the vertical beams having the identical $V_{shift}$.

Alternatively, the step of performing the CSI measurement in accordance with the channel state measurement information includes performing measurement on channels on a set of CRS ports corresponding to each $V_{shift}$, so as to determine CSI.

Alternatively, the step of performing the CSI measurement in accordance with the channel state measurement information further includes reporting the determined CSI corresponding to all the vertical beams, or reporting the determined CSI corresponding to parts of the vertical beams and serial numbers of the parts of the vertical beams.

Alternatively, the CSI includes at least one of Channel Quality Indicator (CQI), Precoding Matrix Indicator (PMI) and Rank Indicator (RI).

In another aspect, the present disclosure provides in some embodiments a CSI measurement device, including: a reception module configured to receive channel state measurement information from a network side, the channel state measurement information including a CRS from a set of CRS ports corresponding to vertical beams having an identical $V_{shift}$ in a vertical dimension, the $V_{shift}$ determines shift values of CRS patterns in different vertical beams in the vertical dimension in a frequency domain; and a measurement module configured to perform CSI measurement in accordance with the channel state measurement information.

Alternatively, in the case that there is only one CRS port corresponding to the vertical beams having the identical $V_{shift}$, the CRS is transmitted over a PBCH in a single-port mode via the CRS port corresponding to all vertical beams; in the case that there are two CRS ports corresponding to the vertical beams having the identical $V_{shift}$, the CRS is transmitted over the PBCH in an SFBC mode via the set of CRS ports corresponding to the vertical beams having the identical $V_{shift}$; and in the case that there are four CRS ports corresponding to the vertical beams having the identical $V_{shift}$, the CRS is transmitted over the PBCH both in an SFBC mode and an FSTD mode via the set of CRS ports corresponding to the vertical beams having the identical $V_{shift}$.

Alternatively, the measurement module is configured to perform measurement on channels on a set of CRS ports corresponding to each $V_{shift}$, so as to determine CSI.

Alternatively, the measurement module is further configured to report the determined CSI corresponding to all the vertical beams, or report the determined CSI corresponding to parts of the vertical beams and serial numbers of the parts of the vertical beams.

Alternatively, the CSI includes at least one of CQI, PMI and RI.

In yet another aspect, the present disclosure provides in some embodiments a signal transmission method, including steps of: determining CRS ports of vertical beams in a vertical dimension, and determining a $V_{shift}$ of the vertical beam corresponding to each CRS port in the vertical dimension, the $V_{shift}$ determines shift values of CRS patterns in different vertical beams in the vertical dimension in a frequency domain; and transmitting CRS via the CRS port in accordance with the $V_{shift}$.

Alternatively, in the case that there is only one CRS port corresponding to the vertical beams having the identical $V_{shift}$, the CRS is transmitted over a PDCCH in a single-port mode via the CRS port corresponding to all the vertical beams; in the case that there are two CRS ports corresponding to the vertical beams having the identical $V_{shift}$, the CRS is transmitted over the PDCCH in an SFBC mode via the set of CRS ports corresponding to the vertical beams having the identical $V_{shift}$; and in the case that there are four CRS ports corresponding to the vertical beams having the identical $V_{shift}$, the CRS is transmitted over the PDCCH both in an SFBC mode and an FSTD mode via the set of CRS ports corresponding to the vertical beams having the identical $V_{shift}$.

In still yet another aspect, the present disclosure provides in some embodiments a signal transmission device, including: a determination module configured to determine CRS ports of vertical beams in a vertical dimension, and determine a $V_{shift}$ of the vertical beam corresponding to each CRS port in the vertical dimension, the $V_{shift}$ determines shift values of CRS patterns in different vertical beams in the vertical dimension in a frequency domain; and a transmission module configured to transmit CRS via the CRS port in accordance with the $V_{shift}$.

Alternatively, in the case that there is only one CRS port corresponding to the vertical beams having the identical $V_{shift}$, the CRS is transmitted over a PDCCH in a single-port mode via the CRS port corresponding to all the vertical beams; in the case that there are two CRS ports corresponding to the vertical beams having the identical $V_{shift}$, the CRS is transmitted over the PDCCH in an SFBC mode via the set of CRS ports corresponding to the vertical beams having the identical $V_{shift}$; and in the case that there are four CRS ports corresponding to the vertical beams having the identical $V_{shift}$, the CRS is transmitted over the PDCCH both in an SFBC mode and an FSTD mode via the set of CRS ports corresponding to the vertical beams having the identical $V_{shift}$.

In still yet another aspect, the present disclosure provides in some embodiments a signal transmission method, including steps of: receiving CRS from a network side; determining CRS port(s) corresponding to a PDSCH, and determining a $V_{shift}$ of a vertical beam corresponding to the CRS port in a vertical dimension, the $V_{shift}$ determines shift values of CRS patterns in different vertical beams in the vertical dimension in a frequency domain; and performing channel estimation using CRS in accordance with the $V_{shift}$, and performing data demodulation.

In still yet another aspect, the present disclosure provides in some embodiments a signal transmission device, including: a reception module configured to receive a CRS from a network side; a determination module configured to determine a CRS port corresponding to a PDSCH, and determine a $V_{shift}$ of a vertical beam corresponding to the CRS port in a vertical dimension, the $V_{shift}$ determines shift values of CRS patterns in different vertical beams in the vertical dimension in a frequency domain; and a processing module configured to perform channel estimation using CRS in accordance with the $V_{shift}$, and perform data demodulation.

According to the embodiments of the present disclosure, the CSI measurement is performed in accordance with the CRS of the set of CRS ports corresponding to the vertical beams having an identical $V_{shift}$ in the vertical dimension, so that a common signal/channel in the vertical dimension is covered by several vertical beams. Each vertical beam has a small main lobe width, so a constant modulus weight vector may be used. As a result, it is able to prevent the loss of the power efficiency.

In addition, the CRS is used for the measurement and demodulation, so it is able to acquire the 3D-MIMO processing gains by modifying limitedly the existing standard without any additional reference signal overhead.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1:
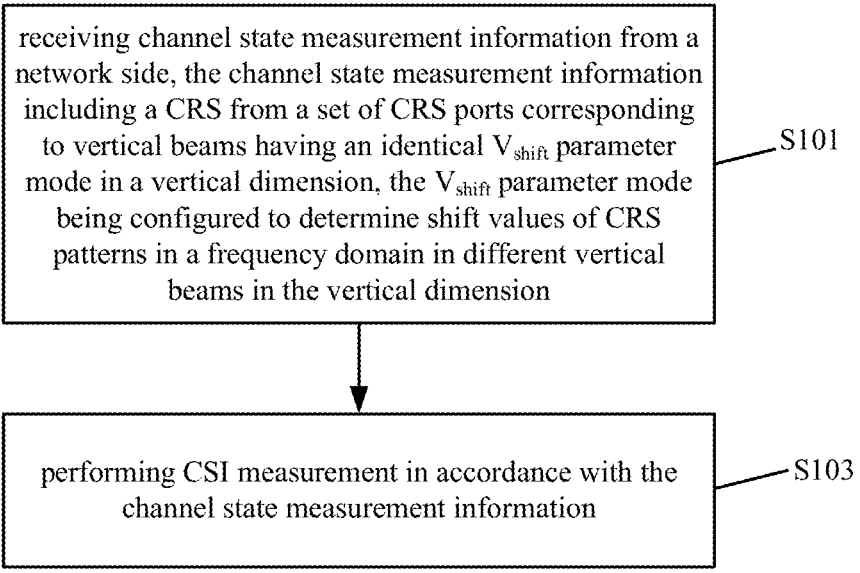
FIG. 1 is a flow chart of a CSI measurement method according to one embodiment of the present disclosure.

The present disclosure will be described hereinafter in conjunction with the drawings and embodiments, and the following embodiments are for illustrative purposes only. For clarity, the following embodiments fail to include all the features of the present disclosure. It should be appreciated that, in order to achieve the purposes of the present disclosure, the development of the following embodiments shall be made under the circumstance where system or service-related conditions are met, and these conditions may vary along with the embodiments. In addition, it should be further appreciated that, although the development may be very complex and time-consuming, it is merely a routine task for an ordinary skilled person who benefits from the present disclosure.

It should be further appreciated that, in order to prevent the present disclosure from being confused due to unnecessary details, merely the structures and/or steps closely related to the present disclosure are shown in the drawings, with the other details being omitted.

The present disclosure provides in some embodiments a CSI measurement method which, as shown in FIG. 1, includes: Step S101 of receiving channel state measurement information from a network side, the channel state measurement information including a CRS from a set of CRS ports corresponding to vertical beams having an identical $V_{shift}$ in a vertical dimension, the $V_{shift}$ determines shift values of CRS patterns in a frequency domain in different vertical beams in the vertical dimension; and Step S103 of performing CSI measurement in accordance with the channel state measurement information.

The set of CRS ports corresponds to the vertical beams having an identical $V_{shift}$, i.e., at least one CRS port corresponding to each kind of the vertical beams having a respective $V_{shift}$. The set of CRS ports consist of at least one CRS port corresponding to the vertical beams having an identical $V_{shift}$.

In the case that there is only one CRS port corresponding to the vertical beams having the identical $V_{shift}$, the CRS is transmitted over a PBCH in a single-port mode via the CRS port corresponding to all the vertical beams; in the case that there are two CRS ports corresponding to the vertical beams having the identical $V_{shift}$, the CRS is transmitted over the PBCH in an SFBC mode via the set of CRS ports corresponding to the vertical beams having the identical $V_{shift}$; and in the case that there are four CRS ports corresponding to the vertical beams having the identical $V_{shift}$, the CRS is transmitted over the PBCH both in an SFBC mode and an FSTD mode via the set of CRS ports corresponding to the vertical beams having the identical $V_{shift}$.

Alternatively, the step of performing the CSI measurement in accordance with the channel state measurement information includes performing measurement on channels on a set of CRS ports corresponding to each $V_{shift}$, so as to determine CSI.

Alternatively, the step of performing the CSI measurement in accordance with the channel state measurement information further includes reporting the determined CSI corresponding to all the vertical beams, or reporting the determined CSI corresponding to parts of the vertical beams and serial numbers of the parts of the vertical beams.

Alternatively, the CSI includes at least one of CQI, PMI and RI.

Figure 2:
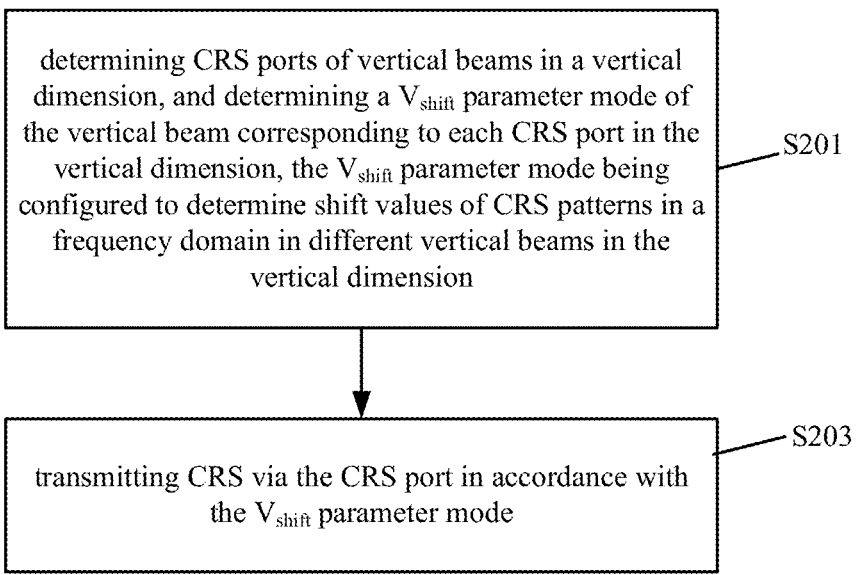
FIG. 2 is a flow chart of a signal transmission method according to one embodiment of the present disclosure.

The present disclosure further provides in some embodiments a signal transmission method which, as shown in FIG. 2, includes: Step S201 of determining CRS ports of vertical beams in a vertical dimension, and determining a $V_{shift}$ of the vertical beam corresponding to each CRS port in the vertical beam, the $V_{shift}$ determines shift values of CRS patterns in a frequency domain in different vertical beams in the vertical dimension; and Step S203 of transmitting CRS via the CRS port in accordance with the $V_{shift}$.

In the case that there is only one CRS port corresponding to the vertical beams having the identical $V_{shift}$, the CRS is transmitted over a PDCCH in a single-port mode via the CRS port corresponding to all the vertical beams; in the case that there are two CRS ports corresponding to the vertical beams having the identical $V_{shift}$, the CRS is transmitted over the PDCCH in an SFBC mode via the set of CRS ports corresponding to the vertical beams having the identical $V_{shift}$; and in the case that there are four CRS ports corresponding to the vertical beams having the identical $V_{shift}$, the CRS is transmitted over the PDCCH both in an SFBC mode and an FSTD mode via the set of CRS ports corresponding to the vertical beams having the identical $V_{shift}$.

Figure 3:
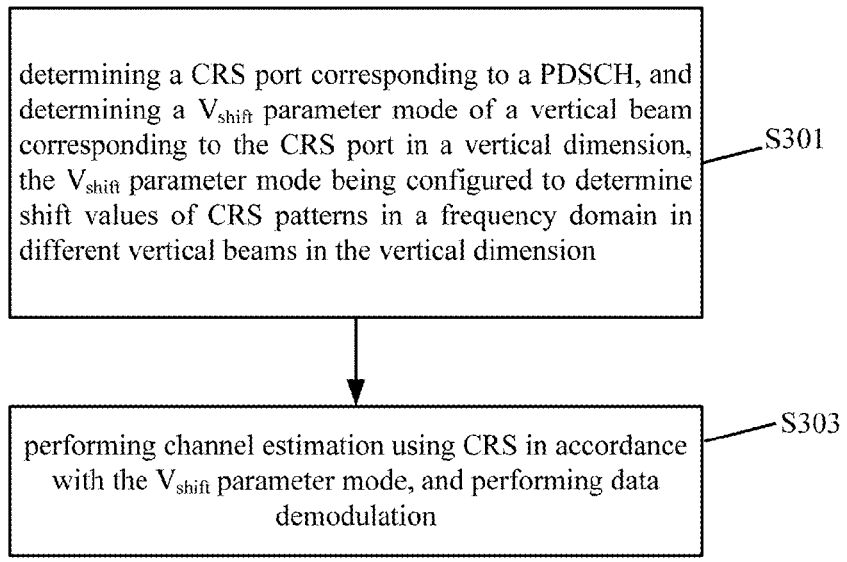
FIG. 3 is a flow chart of another signal transmission method according to one embodiment of the present disclosure.

The present disclosure further provides in some embodiments another signal transmission method which, as shown in FIG. 3, includes: Step S301 of determining a CRS port corresponding to a PDSCH, and determining a $V_{shift}$ of a vertical beam corresponding to the CRS port in a vertical dimension, the $V_{shift}$ determines shift values of CRS patterns in a frequency domain in different vertical beams in the vertical dimension; and Step S303 of performing channel estimation using CRS in accordance with the $V_{shift}$, and performing data demodulation.

For ease of understanding, the present disclosure will be described hereinafter in details on the basis of the transmission of CRS, the transmission over the PBCH, the CRS-based CSI measurement, and CRS-based transmission.

For the transmission of the CRS, at first N beams having different tilt angles may be formed for each CRS port in the vertical dimension by vertical beam-forming. Nest, each CRS port corresponding to the beams in the vertical dimension may be provided with patterns having different $V_{shift}$s (N different values), and these $V_{shift}$s determine the shift values of the CRS patterns in different beams in the frequency domain. Then, a set of CRS ports that use an $n^{th}$ (n=[1, ..., N]) vertical beam (which has the identical $V_{shift}$) simultaneously may be provided with the conventional CRS patterns (i.e., ports 0-3).

For the transmission over the PBCH, there are the following three circumstances. a) In the case that there is only one CRS port (port 0) that uses the vertical beams (which have the identical $V_{shift}$), the CRS may be transmitted over the PBCH in a single-port mode via the CRS port (port 0) corresponding to all the N vertical beams. b) In the case that there are two CRS ports (ports 0-1) that use the vertical beams (which have the identical $V_{shift}$), the CRS may be transmitted over the PBCH in an SFBC mode via the set of CRS ports (ports 0-1) corresponding to the vertical beams having the identical $V_{shift}$. c) In the case that there are four CRS ports (ports 0-3) that use the vertical beams (which have the identical $V_{shift}$), the CRS may be transmitted over the PBCH both in an SFBC mode and an FSTD mode via the set of CRS ports (ports 0-3) corresponding to the vertical beams having the identical $V_{shift}$.

For the CRS-based CSI measurement, a User Equipment (UE) needs to perform channel estimation on a set of CRS ports corresponding to each $V_{shift}$, and calculate a CRS feedback value. To be specific, in a first mode, the UE may perform measurement on channels on a set of CRS ports corresponding to each $V_{shift}$, and calculate and report all N sets of CQI/PMI/RI or CQI in accordance with a reporting mode configured at the network side. In a second mode, the UE may perform measurement on channels on a set of CRS ports corresponding to each $V_{shift}$, and report less than N sets of CQI/PMI/RI or CQI and corresponding serial numbers of the vertical beams in accordance with the reporting mode configured at the network side.

For the CRS-based transmission, the CRS may be transmitted over PDCCH or PDSCH.

For the transmission over the PDCCH, there are the following three circumstances. 1) In the case that there is only one CRS port (port 0) that uses the vertical beams (which have the identical $V_{shift}$), the CRS may be transmitted over the PDCCH in a single-port mode via the CRS port (port 0) corresponding to all the N vertical beams. b) In the case that there are two CRS ports (ports 0-1) that use the vertical beams (which have the identical $V_{shift}$), the CRS may be transmitted over the PDCCH in an SFBC mode via the set of CRS ports (ports 0-1) corresponding to the vertical beams having the identical $V_{shift}$. c) In the case that there are four CRS ports (ports 0-3) that use the vertical beams (which have the identical $V_{shift}$), the CRS may be transmitted over the PDCCH both in an SFBC mode and an FSTD mode via the set of CRS ports (ports 0-3) corresponding to the vertical beams having the identical $V_{shift}$.

For the transmission over the PDSCH, the scheduled UE may acquire, in accordance with control signaling, that the CRS port corresponding to the PDSCH is to be transmitted via which vertical beam (i.e., it may acquire the $V_{shift}$), and then perform the channel estimation using the CRS in accordance with the $V_{shift}$ and perform the data demodulation.

In the case that a signal $a_{k,l}^{(p)}$ is transmitted via a CRS port p (port number) over a sub-carrier k (sub-carrier index) and an OFDM symbol l (symbol number), a relationship among p, k, l and the $V_{shift}$ is shown as follows:

$$k = 6m + (v + v_{shift}) \bmod 6$$
$$l = \begin{cases} 0, N_{symb}^{DL} - 3 & \text{if } p \in \{0, 1\} \\ 1 & \text{if } p \in \{2, 3\} \end{cases},$$
$$m = 0, 1, \ldots, 2 \cdot N_{RB}^{DL} - 1$$

wherein $V_{shift}$=0, ..., 5, $N_{symb}^{DL}$ represents the number of the OFDM symbols in each time slot, and $N_{RB}^{DL}$ represents the number of downlink Resource Blocks (RBs).

Figure 4:
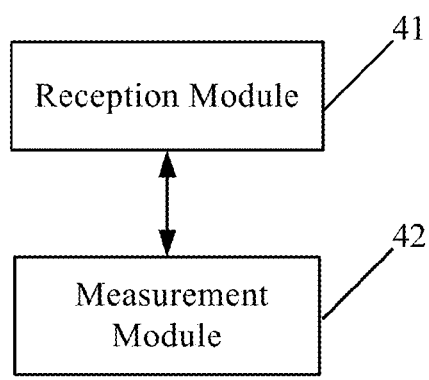
FIG. 4 is a schematic view showing a CSI measurement device according to one embodiment of the present disclosure.

The present disclosure further provides in some embodiments a CSI measurement device which, as shown in FIG. 4, includes: a reception module 41 configured to receive channel state measurement information from a network side, the channel state measurement information including a CRS from a set of CRS ports corresponding to vertical beams having an identical $V_{shift}$ in a vertical dimension, the $V_{shift}$ determines shift values of CRS patterns in a frequency domain in different vertical beams in the vertical dimension; and a measurement module 42 configured to perform CSI measurement in accordance with the channel state measurement information.

In the case that there is only one CRS port corresponding to the vertical beams having the identical $V_{shift}$, the CRS is transmitted over a PBCH in a single-port mode via the CRS port corresponding to all vertical beams; in the case that there are two CRS ports corresponding to the vertical beams having the identical $V_{shift}$, the CRS is transmitted over the PBCH in an SFBC mode via the set of CRS ports corresponding to the vertical beams having the identical $V_{shift}$; and in the case that there are four CRS ports corresponding to the vertical beams having the identical $V_{shift}$, the CRS is transmitted over the PBCH both in an SFBC mode and an FSTD mode via the set of CRS ports corresponding to the vertical beams having the identical $V_{shift}$.

Alternatively, the measurement module 42 is configured to perform measurement on channels on a set of CRS ports corresponding to each $V_{shift}$, so as to determine CSI.

Alternatively, the measurement module 42 is further configured to report the determined CSI corresponding to all the vertical beams, or report the determined CSI corresponding to parts of the vertical beams and serial numbers of the parts of the vertical beams.

Alternatively, the CSI includes at least one of CQI, PMI and RI.

Figure 5:
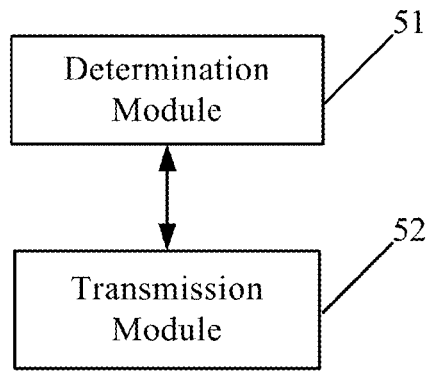
FIG. 5 is a schematic view showing a signal transmission device according to one embodiment of the present disclosure.

The present disclosure further provides in some embodiments a signal transmission device which, as shown in FIG. 5, includes: a determination module 51 configured to determine CRS ports of vertical beams in a vertical dimension, and determine a $V_{shift}$ of the vertical beam corresponding to each CRS port in the vertical dimension, the $V_{shift}$ determines shift values of CRS patterns in a frequency domain in different vertical beams in the vertical dimension; and a transmission module 52 configured to transmit CRS via the CRS port in accordance with the $V_{shift}$.

In the case that there is only one CRS port corresponding to the vertical beams having the identical $V_{shift}$, the CRS is transmitted over a PDCCH in a single-port mode via the CRS port corresponding to all the vertical beams; in the case that there are two CRS ports corresponding to the vertical beams having the identical $V_{shift}$, the CRS is transmitted over the PDCCH in an SFBC mode via the set of CRS ports corresponding to the vertical beams having the identical $V_{shift}$; and in the case that there are four CRS ports corresponding to the vertical beams having the identical $V_{shift}$, the CRS is transmitted over the PDCCH both in an SFBC mode and an FSTD mode via the set of CRS ports corresponding to the vertical beams having the identical $V_{shift}$.

Figure 6:
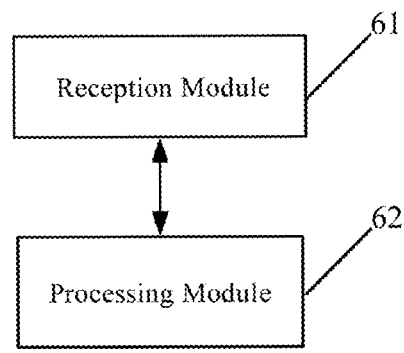
FIG. 6 is a schematic view showing another signal transmission device according to one embodiment of the present disclosure.

The present disclosure further provides in some embodiments a signal transmission device which, as shown in FIG. 6, includes: a reception module 61 configured to receive CRS from a network side; a determination module configured to determine a CRS port corresponding to a PDSCH, and determine a $V_{shift}$ of a vertical beam corresponding to the CRS port in a vertical dimension, the $V_{shift}$ determines shift values of CRS patterns in a frequency domain in different vertical beams in the vertical dimension; and a processing module 62 configured to perform channel estimation using CRS in accordance with the $V_{shift}$, and performing data demodulation.

According to the embodiments of the present disclosure, the CSI measurement is performed in accordance with the CRS of the set of CRS ports corresponding to the vertical beams having an identical $V_{shift}$ in the vertical dimension, so that a common signal/channel in the vertical dimension is covered by several vertical beams. Each vertical beam has a small main lobe width, so a constant modulus weight vector may be used. As a result, it is able to prevent the loss of the power efficiency.

In addition, the CRS is used for the measurement and demodulation, so it is able to acquire the 3D-MIMO processing gains by modifying limitedly the existing standard without any additional reference signal overhead.

A basic principle of the present disclosure has been described hereinbefore in conjunction with the embodiments. However, it should be appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future.

The present disclosure further provides in some embodiments a storage medium (e.g., a Read Only Memory (ROM), a Random Access Memory (RAM), a hard disc, or a removable memory). A computer program for the allocation of resources may be stored in the storage medium and include program codes so as to: receive channel state measurement information from a network side, the channel state measurement information including a CRS from a set of CRS ports corresponding to vertical beams having an identical $V_{shift}$ in a vertical dimension, the $V_{shift}$ determines shift values of CRS patterns in a frequency domain in different vertical beams in the vertical dimension; and perform CSI measurement in accordance with the channel state measurement information.

The present disclosure further provides in some embodiments a storage medium (e.g., a Read Only Memory (ROM), a Random Access Memory (RAM), a hard disc, or a removable memory). A computer program for the allocation of resources may be stored in the storage medium and include program codes so as to: determine CRS ports of vertical beams in a vertical dimension, and determine a $V_{shift}$ of the vertical beam corresponding to each CRS port in the vertical dimension, the $V_{shift}$ determines shift values of CRS patterns in a frequency domain in different vertical beams in the vertical dimension; and transmit CRS via the CRS port in accordance with the $V_{shift}$.

The present disclosure further provides in some embodiments a storage medium (e.g., a Read Only Memory (ROM), a Random Access Memory (RAM), a hard disc, or a removable memory). A computer program for the allocation of resources may be stored in the storage medium and include program codes so as to: determine a CRS port corresponding to a PDSCH, and determine a $V_{shift}$ of a vertical beam corresponding to the CRS port in a vertical dimension, the $V_{shift}$ determines shift values of CRS patterns in a frequency domain in different vertical beams in the vertical dimension; and perform channel estimation using CRS in accordance with the $V_{shift}$, and perform data demodulation.

The present disclosure further provides in some embodiments a computer program including program codes so as to: receive channel state measurement information from a network side, the channel state measurement information including a CRS from a set of CRS ports corresponding to vertical beams having an identical $V_{shift}$ in a vertical dimension, the $V_{shift}$ determines shift values of CRS patterns in a frequency domain in different vertical beams in the vertical dimension; and perform CSI measurement in accordance with the channel state measurement information.

The present disclosure further provides in some embodiments a computer program including program codes so as to: determine CRS ports of vertical beams in a vertical dimension, and determine a $V_{shift}$ of the vertical beam corresponding to each CRS port in the vertical dimension, the $V_{shift}$ determines shift values of CRS patterns in a frequency domain in different vertical beams in the vertical dimension; and transmit CRS via the CRS port in accordance with the $V_{shift}$.

The present disclosure further provides in some embodiments a computer program including program codes so as to: determine a CRS port corresponding to a PDSCH, and determine a $V_{shift}$ of a vertical beam corresponding to the CRS port in a vertical dimension, the $V_{shift}$ determines shift values of CRS patterns in a frequency domain in different vertical beams in the vertical dimension; and perform channel estimation using CRS in accordance with the $V_{shift}$, and perform data demodulation.

Figure 7:
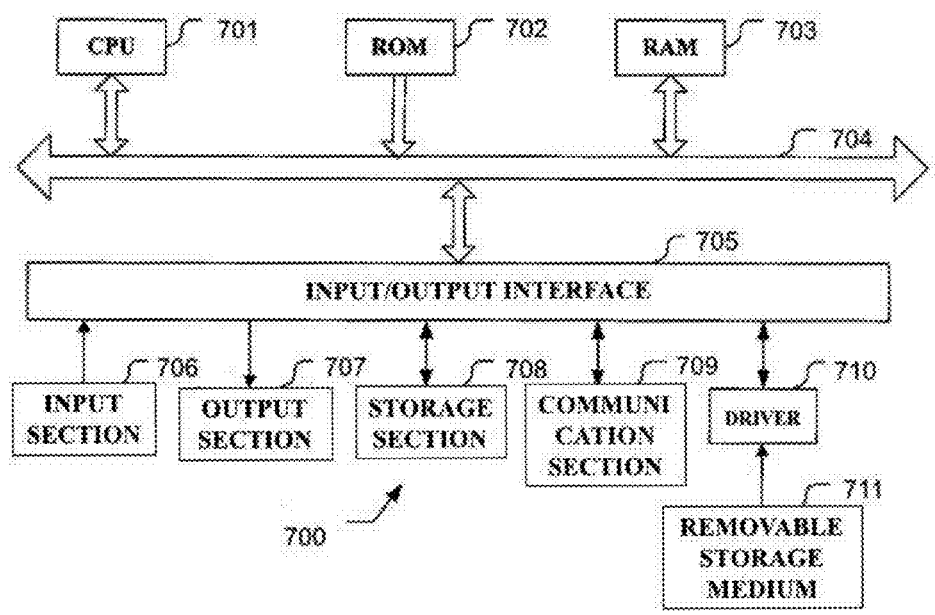
FIG. 7 is block diagram of a computer according to one embodiment of the present disclosure.

In the case that the present disclosure is implemented in the form of software and/or firmware, programs may be installed in a computer with a dedicated hardware structure, e.g., a general-purpose computer 700 in FIG. 7, via the storage medium or a network, so as to achieve various functions.

In FIG. 7, a Central Processing Unit (CPU) 701 may execute various processings in accordance with the programs stored in a ROM 702 or the programs loaded into a RAM 703 via a storage section 708. Data desired for the operation of the CPU 701 may also be stored in the RAM 703 according to the practical need. The CPU 701, the ROM 702 and the RAM 703 are connected to each other via a bus 704. In addition, an input/output interface 705 is also connected to the bus 704.

An input section 706 (including a keyboard and a mouse), an output section 707 (including a display such as Cathode Ray Tube (CRT) or a Liquid Crystal Display (LCD), and a speaker), a storage section 708 (including a hard disk) and a communication section 709 (including a network interface card such as Local Area Network (LAN) card, and a Modem) may also be connected to the input/output interface 705. The communication section 709 is configured to perform the communication over a network, e.g., Internet.

If desired, a driver 710 may also be connected to the input/output interface 705, and a removable storage medium 711 such as a magnetic disk, an optical disk, a magneto-optical disk or a semiconductor memory may be installed on the driver 710, so as to read the computer programs therefrom and install them into the storage section 708.

In the case that the above-mentioned processings are implemented via software, the programs may be installed from the network, e.g., Internet, or the storage medium, e.g., the removable storage medium 711.

It should be appreciated that, the storage medium is not limited to the removable storage medium 711 in FIG. 7 in which the programs are stored and which may be distributed in such a manner as to be detachable from the device so as to provide the programs to a user. The removable storage medium 711 may include a magnetic disk (including a floppy disk (registered trademark), an optical disk (including Compact Disk Read Only Memory (CD-ROM) and Digital Video Disk (DVD), a magneto-optical disk (including Mini Disk (registered trademark) and a semiconductor memory. Alternatively, the storage media may be a hard disk included in the storage section 708 and the ROM 702 in which the programs are stored, and the storage media may be distributed to the user together with the device including them.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

Although the present disclosure and its advantages have been described hereinabove, it should be appreciated that, various modifications, substitutions and alternations may be further made without departing from the spirit and scope defined by the appended claims. Such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

What is claimed is:

1. A Channel State Information (CSI) measurement method, comprising steps of:

receiving channel state measurement information from a network side, the channel state measurement information comprising a Cell-specific Reference Signal (CRS) from a set of CRS ports corresponding to vertical beams having an identical $V_{shift}$ in a vertical dimension, wherein the $V_{shift}$ determines shift values of CRS patterns in different vertical beams in the vertical dimension, in a frequency domain; and performing CSI measurement in accordance with the channel state measurement information, wherein in the case that a signal $a_{k,l}^{(p)}$ is transmitted via a CRS port p (port number) over a sub-carrier k (sub-carrier index) and an OFDM symbol l (symbol number), a relationship among p, k, l and $V_{shift}$ is shown as follows:

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases},$$

$$m = 0, 1, \ldots, 2 \cdot N_{RB}^{DL} - 1$$

wherein $V_{shift}=0, \ldots 5$, $N_{symb}^{DL}$ represents the number of the OFDM symbols in each time slot, and $N_{RB}^{DL}$ represents the number of downlink Resource Blocks (RBs).

2. The CSI measurement method according to claim 1, wherein in the case that there is only one CRS port corresponding to the vertical beams having the identical $V_{shift}$, the CRS is transmitted over a Physical Broadcast Channel (PBCH) in a single-port via the CRS port corresponding to all the vertical beams;

in the case that there are two CRS ports corresponding to the vertical beams having the identical $V_{shift}$, the CRS is transmitted over the PBCH in a Space Frequency Block Code (SFBC) via the set of CRS ports corresponding to the vertical beams having the identical $V_{shift}$; and in the case that there are four CRS ports corresponding to the vertical beams having the identical $V_{shift}$, the CRS is transmitted over the PBCH both in an SFBC and a Frequency Switched Transmit Diversity (FSTD) via the set of CRS ports corresponding to the vertical beams having the identical $V_{shift}$.

3. The CSI measurement method according to claim 1, wherein the step of performing the CSI measurement in accordance with the channel state measurement information comprises performing measurement on channels on a set of CRS ports corresponding to each $V_{shift}$, so as to determine CSI.

4. The CSI measurement method according to claim 3, wherein the step of performing the CSI measurement in accordance with the channel state measurement information further comprises reporting the determined CSI corresponding to all the vertical beams, or reporting the determined CSI corresponding to parts of the vertical beams and serial numbers of the parts of the vertical beams.

5. The CSI measurement method according to claim 1, wherein the CSI comprises at least one of Channel Quality Indicator (CQI), Precoding Matrix Indicator (PMI) and Rank Indicator (RI).

6. A Channel State Information (CSI) measurement device, comprising:

a reception module configured to receive channel state measurement information from a network side, the channel state measurement information comprising a Cell-specific Reference Signal (CRS) from a set of CRS ports corresponding to vertical beams having an identical $V_{shift}$ in a vertical dimension, wherein the $V_{shift}$ determines shift values of CRS patterns in different vertical beams in the vertical dimension in a frequency domain; and a measurement module configured to perform CSI measurement in accordance with the channel state measurement information, wherein in the case that a signal $a_{k,l}^{(p)}$ is transmitted via a CRS port p (port number) over a sub-carrier k (sub-carrier index) and an OFDM symbol l (symbol number), a relationship among p, k, l and $V_{shift}$ is shown as follows:

$$k = 6m + (v + v_{shift}) \bmod 6$$
$$l = \begin{cases} 0, N_{symb}^{DL} - 3 & \text{if } p \in \{0, 1\} \\ 1 & \text{if } p \in \{2, 3\} \end{cases},$$
$$m = 0, 1, \ldots, 2 \cdot N_{RB}^{DL} - 1$$

wherein $V_{shift}$=0, . . . , 5, $N_{symb}^{DL}$ represents the number of the OFDM symbols in each time slot, and $N_{RB}^{DL}$ represents the number of downlink Resource Blocks (RBs).

7. The CSI measurement device according to claim 6, wherein in the case that there is only one CRS port corresponding to the vertical beams having the identical $V_{shift}$, the CRS is transmitted over a Physical Broadcast Channel (PBCH) in a single-port via the CRS port corresponding to all the vertical beams;

in the case that there are two CRS ports corresponding to the vertical beams having the identical $V_{shift}$, the CRS is transmitted over the PBCH in a Space Frequency Block Code (SFBC) via the set of CRS ports corresponding to the vertical beams having the identical $V_{shift}$; and in the case that there are four CRS ports corresponding to the vertical beams having the identical $V_{shift}$, the CRS is transmitted over the PBCH both in an SFBC and a Frequency Switched Transmit Diversity (FSTD) via the set of CRS ports corresponding to the vertical beams having the identical $V_{shift}$.

8. The CSI measurement device according to claim 6, wherein the measurement module is configured to perform measurement on channels on a set of CRS ports corresponding to each $V_{shift}$, so as to determine CSI.

9. The CSI measurement device according to claim 8, wherein the measurement module is further configured to report the determined CSI corresponding to all the vertical beams, or report the determined CSI corresponding to parts of the vertical beams and serial numbers of the parts of the vertical beams.

10. The CSI measurement device according to claim 6, wherein the CSI comprises at least one of Channel Quality Indicator (CQI), Precoding Matrix Indicator (PMI) and Rank Indicator (RI).

11. A signal transmission method, comprising steps of:
determining Cell-specific Reference Signal (CRS) ports of vertical beams in a vertical dimension, and determining a $V_{shift}$ of the vertical beam corresponding to each CRS port in the vertical dimension, wherein the $V_{shift}$ determines shift values of CRS patterns in different vertical beams in the vertical dimension in a frequency domain; and transmitting CRS via the CRS port in accordance with the $V_{shift}$, wherein in the case that a signal $a_{k,l}^{(p)}$ is transmitted via a CRS port p (port number) over a sub-carrier k (sub-carrier index) and an OFDM symbol l (symbol number), a relationship among p, k, l and $V_{shift}$ is shown as follows:

$$k = 6m + (v + v_{shift}) \bmod 6$$
$$l = \begin{cases} 0, N_{symb}^{DL} - 3 & \text{if } p \in \{0, 1\} \\ 1 & \text{if } p \in \{2, 3\} \end{cases},$$
$$m = 0, 1, \ldots, 2 \cdot N_{RB}^{DL} - 1$$

wherein $V_{shift}$=0, . . . , 5, $N_{symb}^{DL}$ represents the number of the OFDM symbols in each time slot, and $N_{RB}^{DL}$ represents the number of downlink Resource Blocks (RBs).

12. The signal transmission method according to claim 11, wherein in the case that there is only one CRS port corresponding to the vertical beams having the identical $V_{shift}$, the CRS is transmitted over a Physical Downlink Control Channel (PDCCH) in a single-port via the CRS port corresponding to all the vertical beams;

in the case that there are two CRS ports corresponding to the vertical beams having the identical $V_{shift}$, the CRS is transmitted over the PDCCH in a Space Frequency Block Code (SFBC) via the set of CRS ports corresponding to the vertical beams having the identical $V_{shift}$; and in the case that there are four CRS ports corresponding to the vertical beams having the identical $V_{shift}$, the CRS is transmitted over the PDCCH both in an SFBC and a Frequency Switched Transmit Diversity (FSTD) via the set of CRS ports corresponding to the vertical beams having the identical $V_{shift}$.

13. The CSI measurement method according to claim 11, wherein the CSI comprises at least one of Channel Quality Indicator (CQI), Precoding Matrix Indicator (PMI) and Rank Indicator (RI).

14. A signal transmission device, comprising:
a determination module configured to determine CRS ports of vertical beams in a vertical dimension, and determine a $V_{shift}$ of the vertical beam corresponding to each CRS port in the vertical dimension, wherein the $V_{shift}$ determines shift values of CRS patterns in different vertical beams in the vertical dimension in a frequency domain; and a transmission module configured to transmit CRS via the CRS port in accordance with the $V_{shift}$, wherein in the case that a signal $a_{k,l}^{(p)}$ is transmitted via a CRS port p (port number) over a sub-carrier k (sub-carrier index) and an OFDM symbol l (symbol number), a relationship among p, k, l and $V_{shift}$ is shown as follows:

$$k = 6m + (v + v_{shift}) \bmod 6$$

-continued $$l = \begin{cases} 0, N_{symb}^{DL} - 3 & \text{if } p \in \{0, 1\} \\ 1 & \text{if } p \in \{2, 3\} \end{cases},$$

$$m = 0, 1, \ldots, 2 \cdot N_{RB}^{DL} - 1$$

wherein $V_{shift}=0, \ldots, 5$, $N_{symb}^{DL}$ represents the number of the OFDM symbols in each time slot, and $N_{RB}^{DL}$ represents the number of downlink Resource Blocks (RBs).

15. The signal transmission device according to claim 14, wherein in the case that there is only one CRS port corresponding to the vertical beams having the identical $V_{shift}$, the CRS is transmitted over a Physical Downlink Control Channel (PDCCH) in a single-port via the CRS port corresponding to all the vertical beams;

in the case that there are two CRS ports corresponding to the vertical beams having the identical $V_{shift}$, the CRS is transmitted over the PDCCH in a Space Frequency Block Code (SFBC) via the set of CRS ports corresponding to the vertical beams having the identical $V_{shift}$; and in the case that there are four CRS ports corresponding to the vertical beams having the identical $V_{shift}$, the CRS is transmitted over the PDCCH both in an SFBC and a Frequency Switched Transmit Diversity (FSTD) via the set of CRS ports corresponding to the vertical beams having the identical $V_{shift}$.

16. The CSI measurement method according to claim 14, wherein the CSI comprises at least one of Channel Quality Indicator (CQI), Precoding Matrix Indicator (PMI) and Rank Indicator (RI).

17. A signal transmission method, comprising steps of:
receiving a Cell-specific Reference Signal (CRS) from a network side;
determining a CRS port corresponding to a Physical Downlink Shared Channel (PDSCH), and determining a $V_{shift}$ of a vertical beam corresponding to the CRS port in a vertical dimension, wherein the $V_{shift}$ determines shift values of CRS patterns in different vertical beams in the vertical dimension in a frequency domain; and
performing channel estimation using CRS in accordance with the $V_{shift}$, and performing data demodulation,
wherein in the case that a signal $a_{k,l}^{(p)}$ is transmitted via a CRS port p (port number) over a sub-carrier k (sub-carrier index) and an OFDM symbol l (symbol number), a relationship among p, k, l and $V_{shift}$ is shown as follows:

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases},$$

$$m = 0, 1, \ldots, 2 \cdot N_{RB}^{DL} - 1$$

wherein $V_{shift}=0, \ldots, 5$, $N_{symb}^{DL}$ represents the number of the OFDM symbols in each time slot, and $N_{RB}^{DL}$ represents the number of downlink Resource Blocks (RBs).

18. The CSI measurement method according to claim 17, wherein the CSI comprises at least one of Channel Quality Indicator (CQI), Precoding Matrix Indicator (PMI) and Rank Indicator (RI).

19. A signal transmission device, comprising:
a reception module configured to receive a Cell-specific Reference Signal (CRS) from a network side;
a determination module configured to determine a CRS port corresponding to a Physical Downlink Shared Channel (PDSCH), and determine a $V_{shift}$ of a vertical beam corresponding to the CRS port in a vertical dimension, wherein the $V_{shift}$ determines shift values of CRS patterns in different vertical beams in the vertical dimension in a frequency domain; and
a processing module configured to perform channel estimation using CRS in accordance with the $V_{shift}$ parameter, and perform data demodulation,
wherein in the case that a signal $a_{k,l}^{(p)}$ is transmitted via a CRS port p (port number) over a sub-carrier k (sub-carrier index) and an OFDM symbol l (symbol number), a relationship among p, k, l and $V_{shift}$ is shown as follows:

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases},$$

$$m = 0, 1, \ldots, 2 \cdot N_{RB}^{DL} - 1$$

wherein $V_{shift}=0, \ldots, 5$, $N_{symb}^{DL}$ represents the number of the OFDM symbols in each time slot, and $N_{RB}^{DL}$ represents the number of downlink Resource Blocks (RBs).

20. The CSI measurement device according to claim 19, wherein the CSI comprises at least one of Channel Quality Indicator (CQI), Precoding Matrix Indicator (PMI) and Rank Indicator (RI).

* * * * *